(12) United States Patent
Ohno

(10) Patent No.: US 7,158,687 B2
(45) Date of Patent: Jan. 2, 2007

(54) IMAGE COMBINATION DEVICE

(75) Inventor: Yoshinori Ohno, Akiruno (JP)

(73) Assignee: Olympus Corporation, Tokyo (JP)

( * ) Notice: Subject to any disclaimer, the term of this patent is extended or adjusted under 35 U.S.C. 154(b) by 750 days.

(21) Appl. No.: 10/412,875

(22) Filed: Apr. 14, 2003

(65) Prior Publication Data

US 2004/0001639 A1    Jan. 1, 2004

(30) Foreign Application Priority Data

Apr. 23, 2002   (JP) .............................. 2002-120261

(51) Int. Cl.
*G06K 9/40*   (2006.01)
(52) U.S. Cl. ...................... 382/274; 382/254; 382/266
(58) Field of Classification Search ................ 382/274, 382/254, 266, 162, 276, 284, 167; 348/155, 348/362, 584, 224.1, 208.13; 358/450, 453, 358/520, 296
See application file for complete search history.

(56) References Cited

U.S. PATENT DOCUMENTS 5,294,989 A * 3/1994 Moore et al. ............... 348/241
5,381,248 A * 1/1995 Ikeda et al. ................. 358/538
5,550,638 A * 8/1996 Ikeda et al. ................. 358/296
5,982,951 A * 11/1999 Katayama et al. .......... 382/284
6,864,916 B1 * 3/2005 Nayar et al. ............. 348/224.1

* cited by examiner

*Primary Examiner*—Anh Hong Do
(74) *Attorney, Agent, or Firm*—Volpe and Koenig, P.C.

(57) ABSTRACT

An image combination device which obtains a wide dynamic range image through combination of at least two images with different light exposure, including a photographing means for photographing an appropriate light exposure image and a different light exposure light image from the appropriate light exposure image, a dividing means for dividing a lower frequency region from the appropriate light exposure image on a frequency information of the appropriate light exposure image, a statistic means for calculating a statistics value relating to characteristic values of pixel signals in the lower frequency region, a determining means for determining a pixel signal level to divide pixel signals of the appropriate light exposure image into an appropriate region and a bright or dark region on the statistics value, and a combining means for correcting the appropriate light exposure image and the different light exposure image in tone commensurate with a light exposure ratio thereof and combining the appropriate light exposure image and the different light exposure image on the pixel signal level.

35 Claims, 11 Drawing Sheets

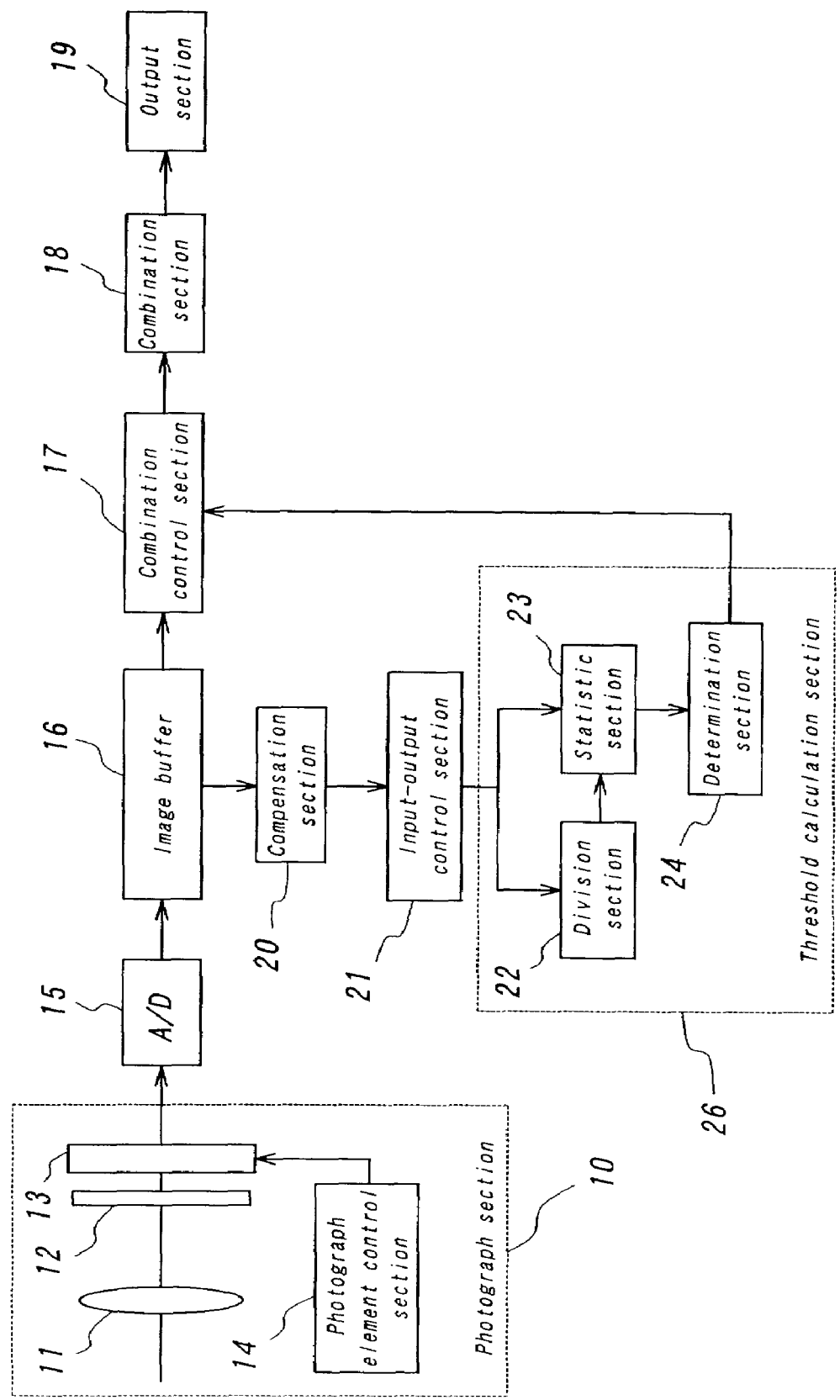

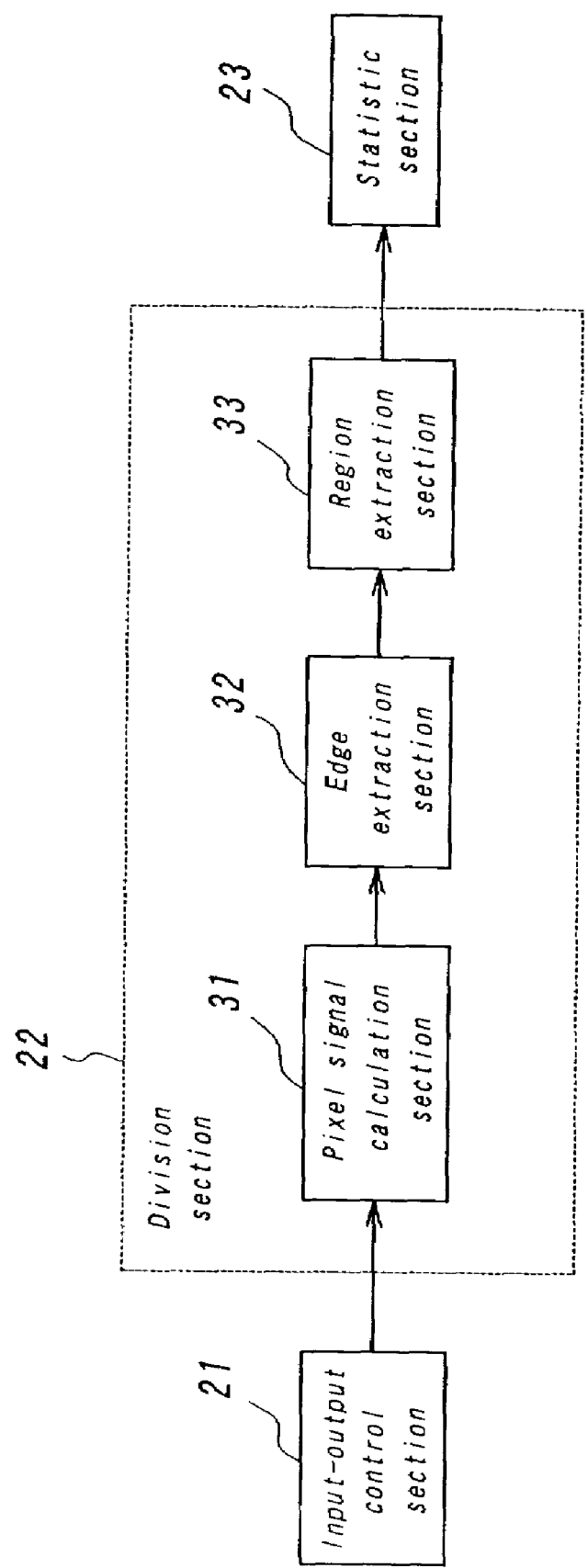

FIG. 3a

| 1 | 0 | -1 |
|---|---|----|
| 1 | 0 | -1 |
| 1 | 0 | -1 |

Lateral direction

| 1 | 1 | 1 |
|---|---|---|
| 0 | 0 | 0 |
| -1 | -1 | -1 |

Vertical direction

FIG. 3b

| 1 | 0 | -1 |
|---|---|----|
| 2 | 0 | -2 |
| 1 | 0 | -1 |

Lateral direction

| 1 | 2 | -1 |
|---|---|----|
| 0 | 0 | 0 |
| -1 | -2 | -1 |

Vertical direction

IMAGE COMBINATION DEVICE

This application claims benefit of Japanese Application No. 2002-120261 filed Apr. 23, 2002, the contents of which are incorporated by this reference.

BACKGROUND OF THE INVENTION

1. Field of the Invention

This invention relates to an image combination device which combines at least two images with their different light exposures to obtain wide dynamic range image with corrected luminance level.

2. Description of the Related Art

Generally, in a solid-state image sensing device such a video camera or digital still camera, the dynamic range can not be enhanced efficiently, so that in the case of photographing in backlight or remarkable contrast, the background for an object becomes canescent if the light exposure is matched for the object and the object becomes black if the light exposure is matched for the background. As a result, the photographing process can not be performed efficiently.

In this point of view, it is proposed to photograph plural images with their respective different light exposures, to define the too bright images and too dark images and to substitute the too bright images and too dark images with images of the appropriate light exposures to obtain a wide dynamic range image.

In this case, however, the switching level for the too bright images and too dark image is defined uniformly, so that a psued-profile or an unnatural combined boundary is created in the resultant combined image. As a result, the quality of the combined image may be deteriorated. In this point of view, the switching level is an important factor in the high precise creation of the combined image.

In Japanese patent Application laid-open 7-131708, such an image combination device is disclosed as to calculate thresholds for too bright regions and too dark regions through the brightness level control calculation at every combination of plural images with different their respective light exposures from an imaging device, and to substitute the too bright regions and too dark regions with non-standard images on the thresholds. In this case, the psued-profile, which is originated from ununiform brightness level due to the fluctuation of the illumination intensity, can be repressed in the resultant combined image.

In Japanese patent Application laid-open 5-130499, such an image combination device is disclosed as to obtain a first image information and a second image information which are photographed with their respective different light exposures to make a brightness histogram on the first image information, to set the minimum bright level on the brightness histogram as a substitution standard brightness level, and to calculate the brightness average of the second image information. In this case, if some white areas are created on the brightness average, the pixels with brightness more than the standard brightness level are substituted, and if some black areas are created on the brightness average, the pixels with brightness less than the standard brightness level are substituted.

SUMMERY OF THE INVENTION

This invention relates to a an image combination device (first image combination device) which obtains a wide dynamic range image through combination of at least two images with different light exposure, including:

a photographing means for photographing an appropriate light exposure image and a different light exposure light image from the appropriate light exposure image, a dividing means for dividing a lower frequency region from the appropriate light exposure image on a frequency information of the appropriate light exposure image, a statistic means for calculating a statistics value relating to characteristic values of pixel signals in the lower frequency region, a determining means for determining a pixel signal level to divide pixel signals of the appropriate light exposure image into an appropriate region and a bright or dark region on the statistics value, and a combining means for correcting the appropriate light exposure image and the different light exposure image in tone commensurate with a light exposure ratio thereof and combining the appropriate light exposure image and the different light exposure image on the pixel signal level.

This invention also relates to an image combination device (second image combination device) which obtains a wide dynamic range image through combination of at least two images with different light exposure, including:

a photographing means for photographing an appropriate light exposure image and a different light exposure light image from the appropriate light exposure image, a dividing means for dividing a lower frequency region from the appropriate light exposure image on a frequency information of the appropriate light exposure image, a limiting means for determining a pixel signal level range which is composed of lower or higher pixel signals in brightness than a predetermined value within a range of the different light exposure image corresponding to the lower frequency region of the appropriate light exposure image, and a combining means for correcting the appropriate light exposure image and the different light exposure image in tone commensurate with a light exposure ratio thereof and combining the appropriate light exposure image and the different light exposure image on the pixel signal level.

Moreover, this invention relates to an image combination device (third image combination device) which obtains a wide dynamic range image through combination of at least two images with different light exposure, including:

a photographing means for photographing an appropriate light exposure image and a different light exposure light image from the appropriate light exposure image, a dividing means for dividing a lower frequency region from the appropriate light exposure image on a frequency information of the appropriate light exposure image, a limiting means for determining a pixel signal level range which is composed of lower or higher pixel signals in brightness than a predetermined value within a range of the different light exposure image corresponding to the lower frequency region of the appropriate light exposure image, a statistic means for calculating a statistics value relating to characteristic values of pixel signals in the lower frequency region, a determining means for determining a pixel signal level to divide pixel signals of the appropriate light exposure image into an appropriate region and a bright or dark region on the statistics value, and a combining means for correcting the appropriate light exposure image and the different light exposure image in tone commensurate with a light exposure ratio thereof and combining the appropriate light exposure image and the different light exposure image on the pixel signal level.

In the first image combination device, the dividing means, the statistic means and the determining means constitute a threshold value calculating means.

In the second image combination device, the dividing means and the limiting means constitutes a range calculating means.

In the third image combination device, the dividing means, the statistic means, the determining means and the limiting means constitute a threshold value calculating means.

In a preferred embodiment of the first through the third image combination devices, the dividing means includes:
a pixel signal calculating means for calculating the pixel signals of the appropriate light exposure image,
an edge extracting means for calculating edge intensities on the pixel signals of the appropriate light exposure image, and
a region extracting means for extracting edge non-existence regions on comparison with the edge intensities and a predetermined value.

In a preferred embodiment of the first and the third image combination devices, the statistic means includes:
a pixel extracting means for reading out the pixel signals in the lower frequency region of the appropriate light exposure image,
an adding means for calculating a histogram of the pixel signals of the appropriate light exposure image, and
a smoothing means for averaging the adjacent signal levels of the histogram.

In this case, it is desired that the determining means includes:
an extremal value detecting means for differentiating the histogram and thus, detecting maximum values and minimum values of the resultant differentiated data,
a difference detecting means for detecting differences between the minimum values and the maximum values in the vicinity of their respective minimum values and
a comparing means for determining a maximum difference value from the differences between the minimum values and the maximum values.

In a preferred embodiment of the second and the third image combination devices, the limiting means includes:
a setting means to setting a pixel signal level to divide the lower frequency region of the appropriate light exposure image,
an adding means for selecting pixels lower or higher in brightness than a predetermined value within a range of the different light exposure image corresponding to the divided region of the appropriate light exposure image and adding the number of the selected pixels, and
a judging means for judging whether the added pixel number is within an acceptable range or not.

BRIEF DESCRIPTION OF THE DRAWINGS

This invention will be described in detail with reference to the accompanying drawings.

FIG. 1 is a block diagram showing a first embodiment of an image combination device according to the present invention, FIG. 2 is a block diagram of the division section shown in FIG. 1, FIGS. 3a and 3b are constitutional views showing two samples of an edge detection filter to be employed in the edge extraction section shown in FIG. 1.

DESCRIPTION OF THE PREFERRED EMBODIMENTS

This invention will be described in detail hereinafter, with reference to the accompanying figures.

Figure 4:
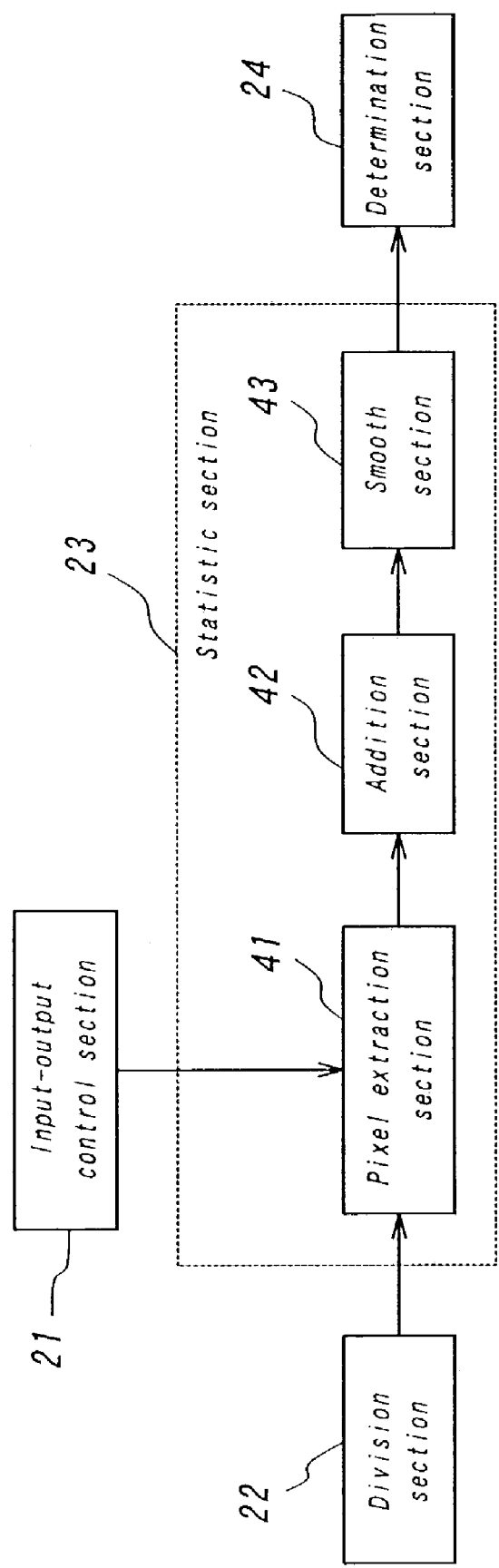
FIG. 4 is a block diagram of the statistic section shown in FIG. 1.
Figure 5:
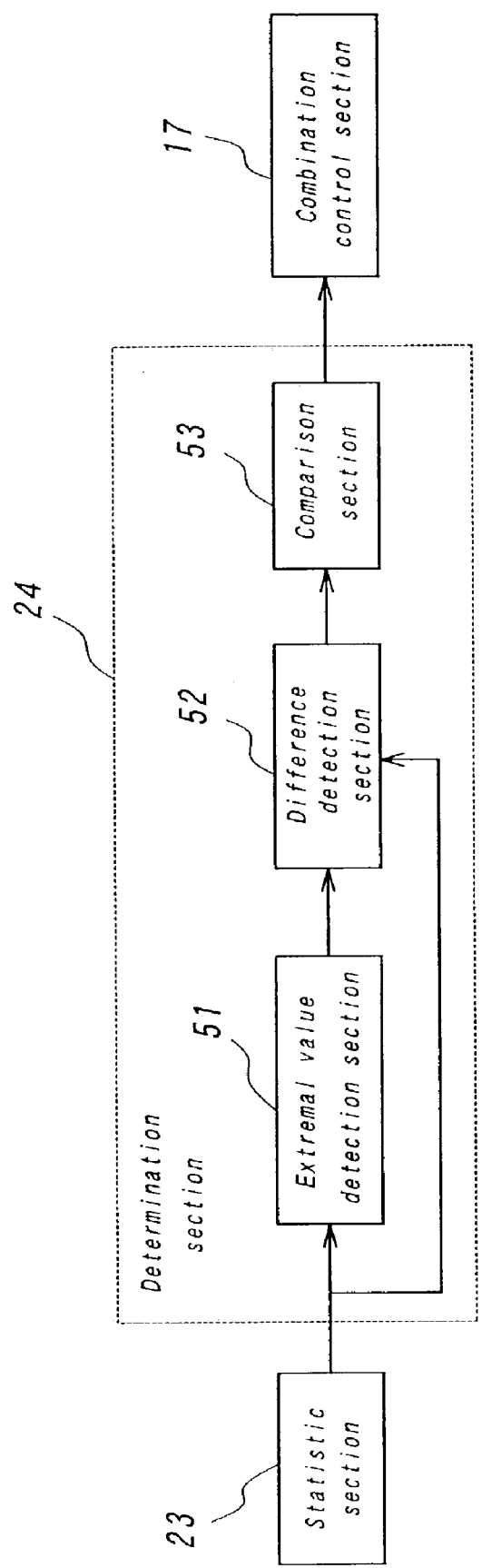
FIG. 5 is a block diagram of the determination section shown in FIG. 1.
Figure 6:
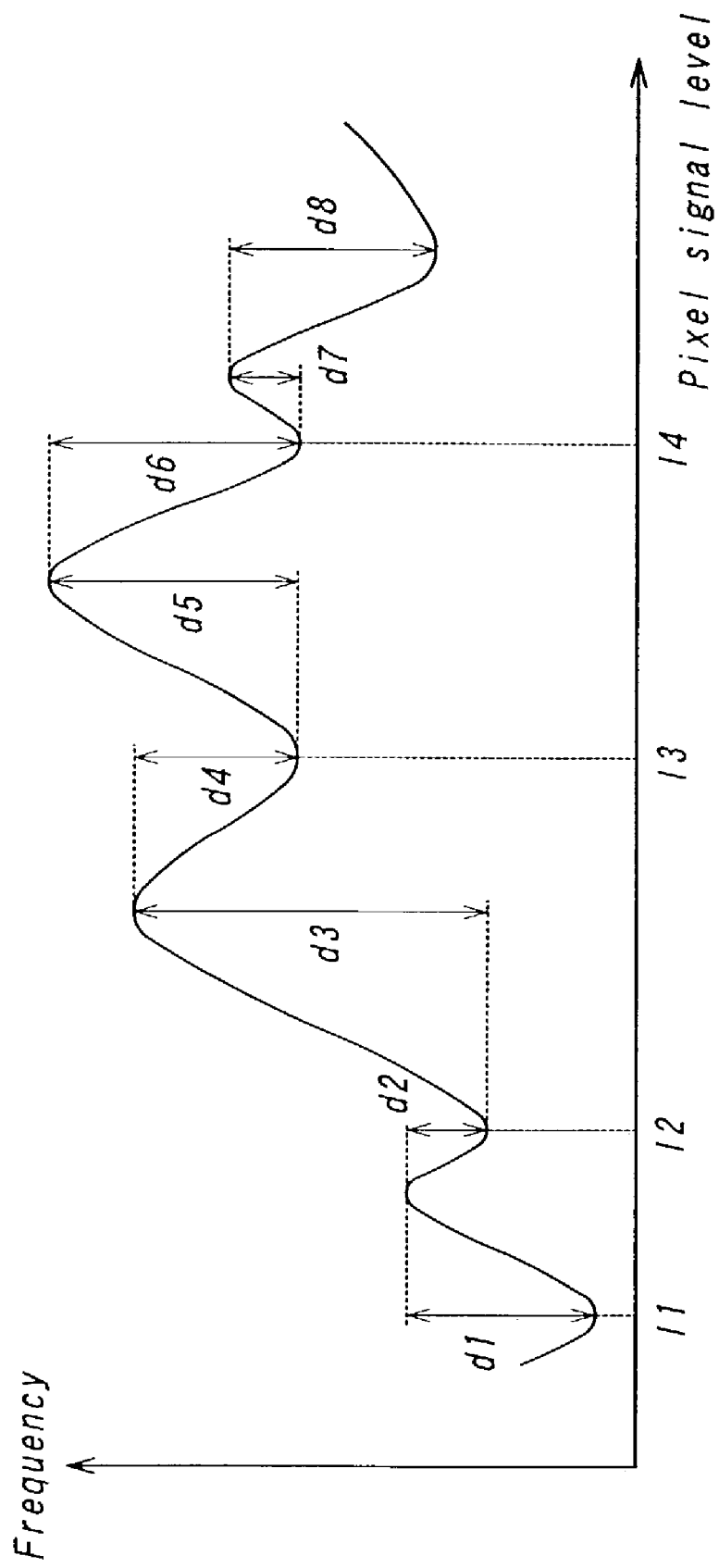
FIG. 6 is an explanatory view showing the operation for the determination section shown in FIG. 5.

FIGS. 1–6 relate to a first embodiment of an image combination device according to the present invention. FIG. 1 is a block diagram of the image combination device of the first embodiment, and FIG. 2 is a block diagram of the division section shown in FIG. 1. FIGS. 3(a) and 3(b) are constitutional views showing two samples of an edge detection filter to be employed in the edge extraction section shown in FIG. 1, and FIG. 4 is a block diagram of the statistic section shown in FIG. 1. FIG. 5 is a block diagram of the determination section shown in FIG. 1, and FIG. 6 is an explanatory view showing the operation for the determination section shown in FIG. 5.

As shown in FIG. 1, the image combination device includes a photograph section 10, an A/D converter 15, an image buffer 16, an combination control section 17, a combination section 18, an output section 19, a compensation section 20, an input-output control section 21, and a threshold calculation section 26. In the photograph section 10, are prepared a lens 11, a low-pass filter 12, a CCD (imaging element) 13 and a photograph element control section 14. In the threshold calculation section 26, are prepared a division section 22, a statistic section 23 and a determination section 24.

In this embodiment, the photographing mode is switched on when the photographing button (not shown) is pushed. In this case, in the photograph section 10, plural images with their respective different light exposures are photographed by the CCD 13 via the lens 11 and the low-pass filter 12 on the control of the photograph element control section 14, and a first image (appropriate light exposure image) with an appropriate light exposure and a second image (short light exposure image) with a smaller light exposure than the first image are defined.

The data of the two images with their respective different light exposures are introduced into the image buffer 16 after the digital conversion at the A/D converter 15, and then, introduced into the combination section 18 via the combination control section 17. Then, the appropriate light exposure image data is introduced into the compensation section 20, where the image data of single plate is compensated to provide an image data of three plates of R (red signal), G (green signal) and B (blue signal), which is introduced into the threshold calculation section 26, the division section 22 and the statistic section 23 on the control of the input-output control section 21. In the compensation section 20, linear calculation or another well known calculation is performed for the compensation.

In the division section 22, a lower frequency region is divided from the appropriate light exposure image on the frequency information thereof. Therefore, the division section 22 includes a pixel signal calculation section 31, an edge extraction section 32 and a region extraction section 33, as shown in FIG. 2. In the pixel signal calculation section 31, a pixel signal calculation means to calculate the pixel signal of the appropriate light exposure image is provided, so that the brightness Y of the image data is calculated on the following equation (1) using color signals of R, G and B, and then, introduced into the edge detection section 32.

$$Y = 0.299 \times R + 0.587 \times G + 0.114 \times B \quad (1)$$

Instead of using the equation (1), the brightness may be composed of a single color signal such as G or the like.

In the edge detection section 32, an edge extraction means to calculate an edge intensity on the brightness from the pixel signal calculation section 31 is provided. As the edge extraction means are exemplified a Prewitt filter as shown in FIG. 3(*a*) and a Sorbel filter as shown in FIG. 3(*b*). The resultant edge intensity signal is introduced into the region extraction section 33.

In the region extraction section 33, is provided a region extraction means which judges the existence of the edges in the appropriate light exposure image and extracts the edge non-existence regions therefrom on the comparison with the edge intensities and a predetermined value. For example, if the edge intensities are larger than the predetermined value, the identifier "0" is defined for the corresponding pixel positions, and if the edge intensities are smaller than the predetermined value, the identifier "1" is defined for the corresponding pixel positions. The identifier number is not restricted to "0" or "1", and any number will do. The defining process is performed for all of the pixels, and the resultant identifier group is introduced into the statistic section 23.

In the statistic section 23, is calculated the statistics value relating to the characteristic values of the pixel signals in the lower frequency region of the appropriate light exposure image from the division section 22. Therefore, the statistic section 23 includes a pixel extraction section 41, an addition section 42 and a smooth section 43. In the pixel extraction section 41, is read out the pixel signals of the lower frequency region of the appropriate light exposure image from the division section 22. Concretely, the pixel brightness signals in the edge non-existence regions in the appropriate light exposure image data are extracted, which are introduced into the addition section 42. For example, the identifier group corresponding to the pixel positions defined as mentioned above is read out, and the brightness signals are calculated on the equation (1) using the image data of three plates of R, G and B only if the identifier "1" (showing non-existence of edge) is detected, or extracted as color signal such as G or the like.

In the addition section 42, a brightness histogram is calculated on the brightness signals from the pixel extraction section 41. Then, the histogram is introduced into the smooth section 43.

In the smooth section 43, the adjacent brightness signal levels of the brightness histogram are smoothed by means of averaging, median or mode. The resultant smoothed histogram of the brightness signals is introduced as a statistics value into the determination section 24.

In the determination section 24, is determined a pixel signal level to divide the appropriate light exposure image into appropriate regions and bright or dark regions. Therefore, the determination section 24 includes an extremal value detection section 51, a difference detection section 52 and a comparison section 53. In the extremal detection section 51, the smoothed histogram is differenciated, and the changing points of plus through minus of the differential values are calculated to detect a maximum value and a minimum value of the smoothed histogram, which are introduced into the difference detection section 52. In this case, if plural maximum values and minimum values are obtained, smaller maximum values and minimum values are removed.

In the difference detection section 52, one minimum value is compared with one maximum value in the vicinity of the minimum value in frequency. The resultant comparison data is introduced into the comparison section 53. In a histogram as shown in FIG. 6, for example, the minimum values I1, I2, I3 . . . are compared with their respective adjacent maximum values to calculate frequency differences di (i=1,2,3 . . . ).

In the comparison section 53, the frequency differences di are compared with one another to detect the maximum value of the frequency differences. In addition, the minimum value Ii in the maximum frequency difference is detected, and then, introduced into the combination control section 17. In the histogram as shown in FIG. 6, for example, since among the calculated frequency differences di, the d3 is maximum, the minimum value I2 in the frequency difference d3 is detected.

In the combination section 18 in FIG. 1, the appropriate light exposure image and the short light exposure image are corrected in tone, and pixels of the appropriate light exposure image beyond the pixel signal level from the determination section 24 in the threshold calculation section 26 are substituted with the corresponding pixels of the short light exposure image. As a result, the two images with their respective different light exposures are combined on the pixel signal level to make one image, which is introduced into the output section 19.

In the output section 19, a well known output processing is performed for the combined image to be stored.

In this embodiment, as mentioned above, plural images with different light exposures are photographed in the photograph section 10, and the lower frequency region of the appropriate light exposure image is detected at the division section 22, and the statistics value relating to the characteristic values of the pixel signals of the lower frequency region at the statistic section 23 is calculated. Then, a pixel signal level to divide the appropriate light exposure image into appropriate regions and bright or dark regions is determined at the determination section 24, and the two images with different light exposures are combined on the pixel signal level at the combination section 18. Therefore, a precise image without unnecessary boundaries can be obtained by a user without a large amount of labor and expenditure of time.

Figure 7:
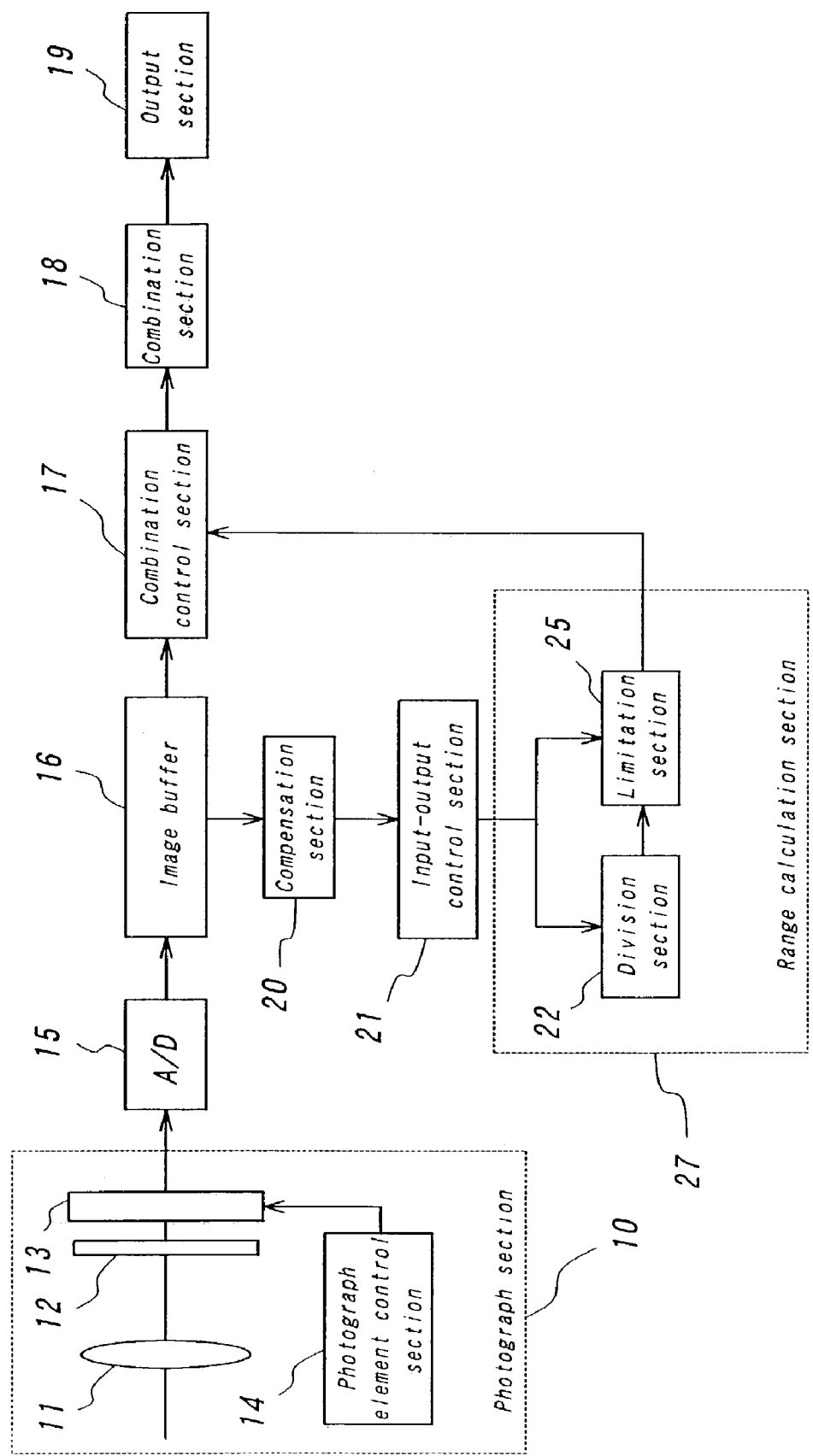
FIG. 7 is a block diagram showing a second embodiment of an image combination device according to the present invention.
Figure 8:
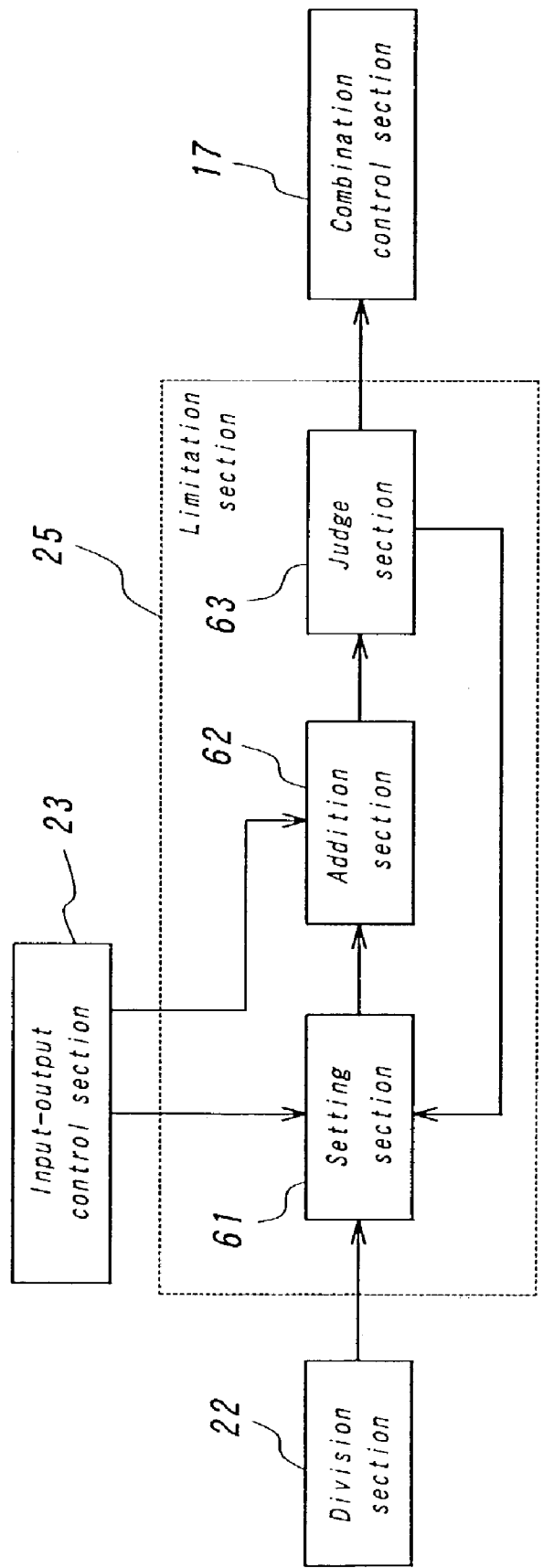
FIG. 8 is a block diagram showing the limitation section shown in FIG. 7.
Figure 9:
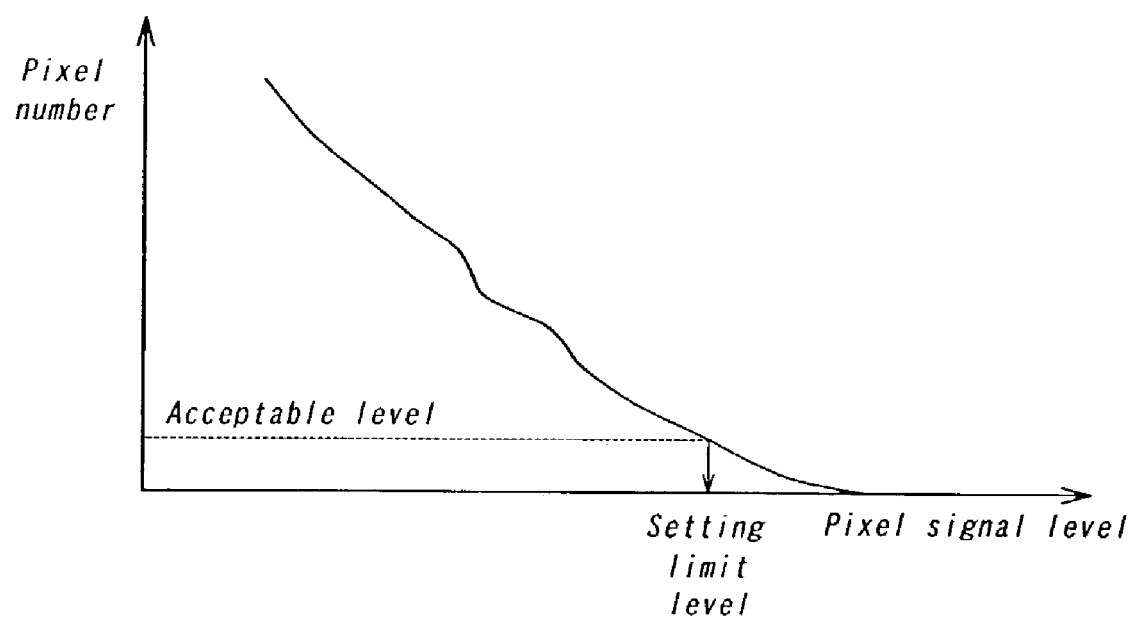
FIG. 9 is an explanatory view showing the operation for the addition section.
Figure 10:
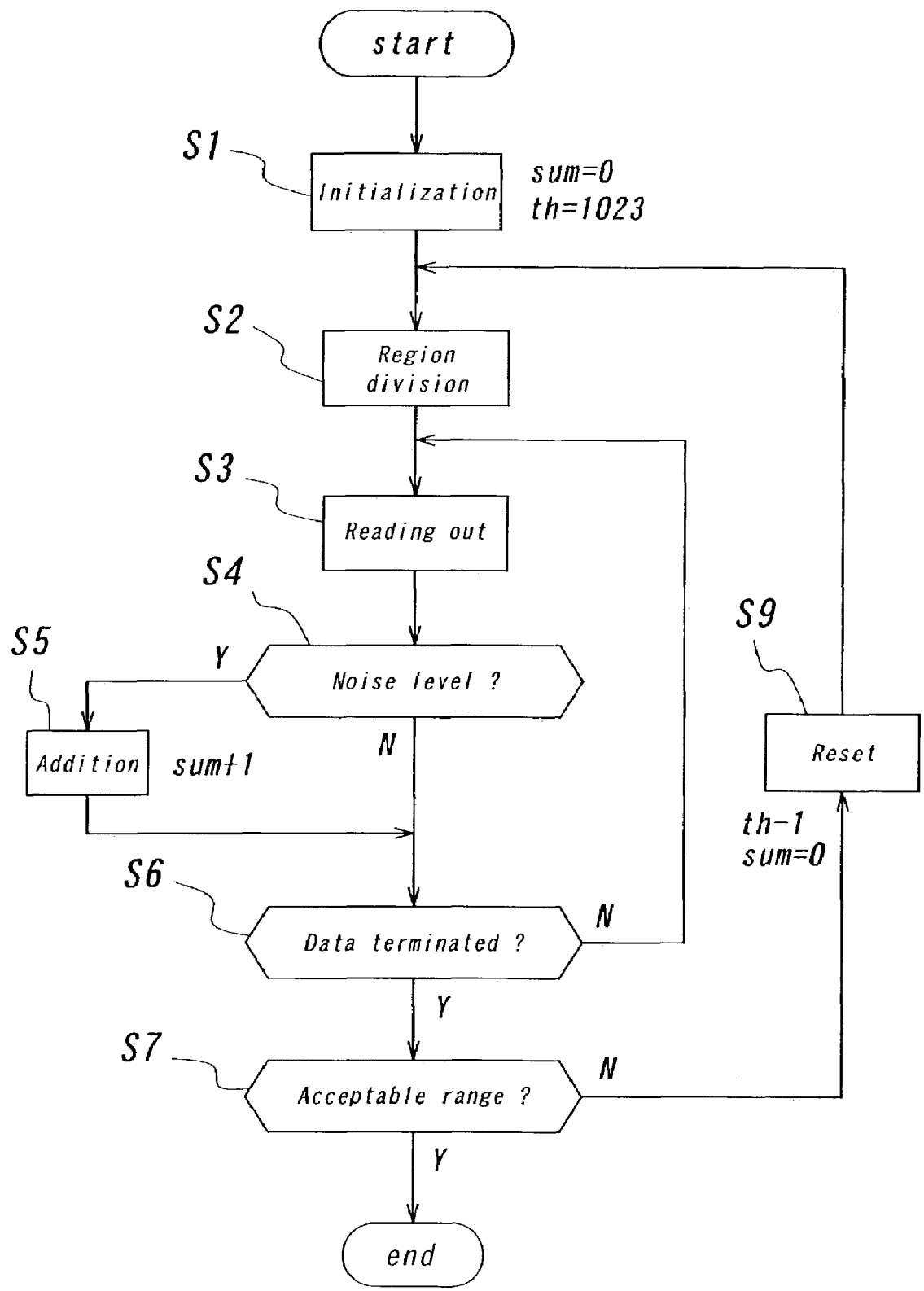
FIG. 10 is a flow chart showing the operation for the limitation section shown in FIG. 7.

FIGS. 7–10 relates to a second embodiment of an image combination device according to the present invention. FIG. 7 is a block diagram showing the image combination device of the second embodiment, and FIG. 8 is a block diagram showing the limitation section shown in FIG. 7. FIG. 9 is an explanatory view showing the operation for the addition section, and FIG. 10 is a flow chart showing the operation for the limitation section shown in FIG. 7.

In this embodiment, instead of the threshold calculation section 26 in the first embodiment, a range calculation section 27 is provided. An appropriate light exposure image and a different and not appropriate light exposure image are introduced into the compensation section 20 from the image buffer 16, and the data of single plate of the light exposure images are compensated to provide image data of three plates of R, G and B, which are introduced into the range calculation section 27 via the input-output control section 21. The other configurations are similar to the ones in the first embodiment, so explanations for the other configurations will be omitted. The same reference numerals are imparted to like or corresponding elements.

The range calculation section 27 includes the division section 22 and a limitation section 25. In the division section 22, a smaller edge intensity region of the appropriate light exposure image is extracted on the control of the input-output control section 21, and then, introduced into the limitation section 25.

In the limitation section 2, is determined pixel signal level range which is composed of lower or higher pixel signals in brightness than a predetermined value within a range of the different light exposure image corresponding to the lower frequency region of the appropriate light exposure image. Therefore, the limitation section 2 includes a setting section 61, an addition section 62, and a judge section 63. In the setting section 61, a brightness level is determined in the smaller edge intensity region from the division section 22, and the appropriate light exposure image from the input-output control section 23 is divided on the brightness level. The divided image data are introduced into the addition section 62.

The brightness level determined at the setting section 61 is initialized to a maximum value of image bit width (1023 at the image of 10 bits) if the different light exposure image with a smaller light exposure than an appropriate light exposure is combined with the appropriate light exposure image, and initialized to a minimum value of image bit width (0 at the image of 10 bits) if the different light exposure image with a larger light exposure than the appropriate light exposure is combined with the appropriate light exposure image.

In the addition section 62, black or white pixels are added within a range of the different light exposure image corresponding to the divided region of the appropriate light exposure image which is to be substituted. The resultant added pixel number is introduced into the judge section 63.

The "black pixel" means a pixel with a smaller brightness than a predetermined value, and the "white pixel" means a pixel with a larger brightness than the predetermined value. In the case of the combination between the appropriate light exposure image and a short light exposure image, for example, since the white pixels of the appropriate light exposure image are substituted with the pixels of the short light exposure image, the black pixels are counted within the substitution range of the short light exposure image.

FIG. 9 is a graph showing the relation between black pixel number and pixel signal level. The abscissa axis designates the pixel signal level as a substitution standard, and the vertical axis designates the black pixel number within the substitution range of the short light exposure image.

In the judge section 63, is judged whether the counted black pixel number is beyond a predetermined number or not. If the black pixel number is not more than the predetermined number, the brightness level is reset to a smaller value than the initial value by "1". Therefore, the brightness level setting process is performed again at the setting section 61. If the black pixel number is more than the predetermined number, the initial brightness level is employed as a limited value to calculate an acceptable range of the pixel signal level. The calculated acceptable range is introduced into the combination control section 17. As a result, the limited value of the pixel signal level within a given standard range can be obtained, as shown in FIG. 9.

In the combination control section 17, a division level is determined within the acceptable range of the pixel signal level by a user, and in the combination section 18, the appropriate light exposure image and the different light exposure image are corrected in tone commensurate with the light exposure ratio of the images, and combined on the division level determined at the combination control section 17. The combined image is introduced into the output section 19.

The operation for the limitation section 25 will be explained with reference to the flow chart illustrated in FIG. 10. In this embodiment, the tone width of an input image signal is set to 10 bits, and the appropriate light exposure image is combined with a short light exposure image.

First of all, the initializing process is performed at a step S1 to set a division brightness level "th" to a maximum value of tone width (1023 at the image of 10 bits) and to set a black level pixel number "sum" to 0. Then, at a step S2, a lower frequency region is divided from the appropriate light exposure image on the division brightness level "th", and at a step S3, brightness signals within a higher range of the short light exposure image than the division brightness level "th" is read out. Thereafter, at a step S4, whether the brightness signals belongs to black level or not is judged, and if the brightness signals belongs to the black level, at a step S5, number "1" is added to the black level pixel number "sum".

Then, at step S6, whether all of the brightness signals are read out or not is judged. If not read out, the same process is repeated at the step S3 through the step S5. If read out, at a step S7, whether the black level pixel number "sum" is beyond a predetermined standard value or not is judged. If not beyond the predetermined standard value, at a step S8, the division brightness level "th" is detracted by "1", and the black level pixel number "sum" is initialized to 0. Then, the same process is repeated at the step S2 through S7.

If beyond the predetermined standard value, an acceptable range of the pixel signal level for the black pixel number is determined.

In this embodiment, as mentioned above, plural images with different light exposures are photographed in the photograph section 10, and the lower frequency region of the appropriate light exposure image is detected at the division section 22. Then, the pixel signal level range not including black pixels or white pixels is determined within a range of the different light exposure image corresponding to the lower frequency region, and a given division level is set within the pixel signal level range. Therefore, the appropriate light exposure image and the different light exposure image can be combined on the division level at the combination section 18. As a result, a precise combined image, not depending on the distribution of pixel signal levels of the input image can be obtained easily by a user without a large amount of labor and expenditure of time.

Figure 11:
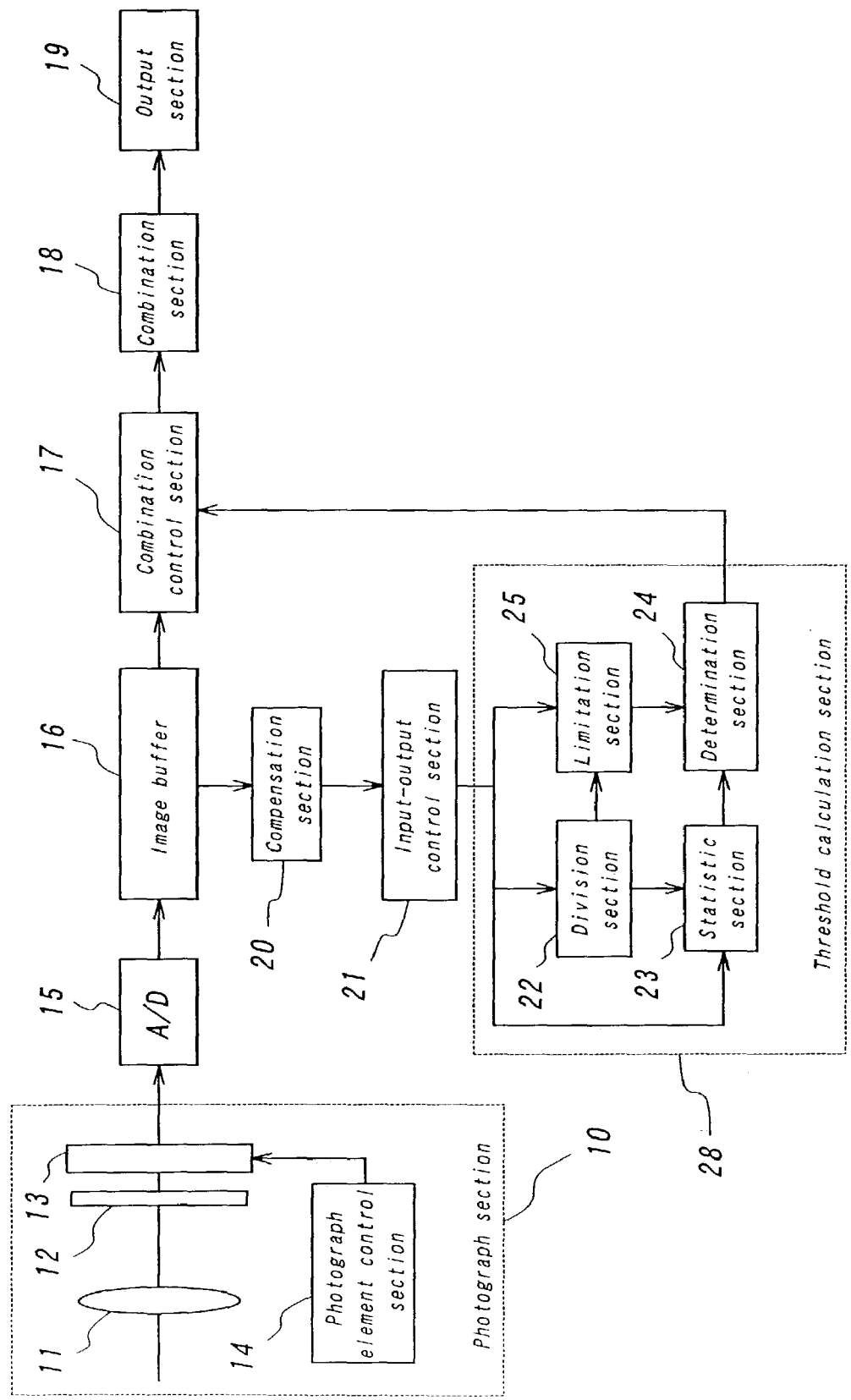
FIG. 11 is a block diagram showing a third embodiment of an image combination device according to the present invention.

FIG. 11 is a block diagram showing a third embodiment of an image combination device according to the present invention. In this embodiment, instead of the range calculation section 27 of the image combination device in the second embodiment, a threshold calculation section 28 is provided, which is a combination of the threshold calculation section 26 in the first embodiment and the range calculation section 27 in the second embodiment. The other configurations are similar to the ones in the first and the second embodiments, so explanations for the other configurations will be omitted. The same reference numerals are imparted to like or corresponding elements.

In this embodiment, the threshold calculation section 28 includes the division section 22, the statistic section 23, the determination section 24 which is included in the threshold calculation section 26 in the first embodiment, and a limitation section 25 which is included in the range calculation section 27 in the second embodiment. At the division section 22, smaller edge intensity regions of an appropriate light exposure image is extracted and introduced into the statistic section 23 and the limitation section 25. At the statistic section 23, a brightness histogram of the lower edge intensity region is calculated, and at the limitation section 25, an acceptable range of a pixel signal level for substitution with a different light exposure image is determined.

At the determination section 24, a pixel signal level is determined in the acceptable range of the pixel signal level, and at the combination section 18, the appropriate light exposure image and the different light exposure image are combined on the control of the combination control section 17 using the pixel signal level. The resultant combined image is processed at the output section 19.

In this embodiment, as mentioned above, plural images with different light exposures are photographed in the photograph section 10, and the lower frequency region of the appropriate light exposure image is detected at the division section 22. Then, the pixel signal level range not including black pixels or white pixels is determined within a range of the different light exposure image corresponding to the lower frequency regions at the limitation section 25, and the statistics value relating to the characteristic values of the pixel signals within the lower frequency region is calculated at the statistic section 23. Then, a pixel signal level to divide the appropriate light exposure image into appropriate regions and bright or dark regions is determined on the pixel signal level range and the statistic value, and the appropriate light exposure image and the different light exposure image are combined on the pixel signal level. Therefore, a precise image without unnecessary boundaries, not depending on the distribution of pixel signal levels of the input image can be obtained by a user without a large amount of labor and expenditure of time.

Although the present invention was described in detail with reference to the above examples, this invention is not limited to the above disclosure and every kind of variation and modification may be made without departing from the scope of the present invention.

In the above-mentioned embodiments, although the appropriate light exposure image and the short light exposure image are combined, the appropriate light exposure image and a long light exposure image may be combined. Also, in the above-mentioned embodiment, although two kinds of light exposure images are employed, three kinds or over of light exposure images may be employed. Moreover, as the light exposure image, a moving image may be employed, instead of the photographed static image.

What is claimed is:

1. An image combination device which obtains a wide dynamic range image through combination of at least two images with different light exposure, comprising:

a photographing means for photographing an appropriate light exposure image and a different light exposure light image from the appropriate light exposure image, a dividing means for dividing a lower frequency region from the appropriate light exposure image on a frequency information of the appropriate light exposure image, a statistic means for calculating a statistics value relating to characteristic values of pixel signals in the lower frequency region, a determining means for determining a pixel signal level to divide pixel signals of the appropriate light exposure image into an appropriate region and a bright or dark region on the statistics value, and a combining means for correcting the appropriate light exposure image and the different light exposure image in tone commensurate with a light exposure ratio thereof and combining the appropriate light exposure image and the different light exposure image on the pixel signal level.

2. The image combination device as defined in claim 1, wherein the dividing means, the statistic means and the determining means constitute a threshold value calculating means.

3. The image combination device as defined in claim 1, wherein the dividing means comprises:

a pixel signal calculating means for calculating the pixel signals of the appropriate light exposure image, an edge extracting means for calculating edge intensities on the pixel signals of the appropriate light exposure image, and a region extracting means for extracting edge non-existence regions on comparison with the edge intensities and a predetermined value.

4. The image combination device as defined in claim 3, wherein in the pixel signal calculating means, a brightness of each pixel of the appropriate light exposure image is calculated.

5. The image combination device as defined in claim 4, wherein the brightness of each pixel of the appropriate light exposure image is calculated on the equation of $Y=0.299 \times R+0.587 \times G+0.114 \times B$ (Y:brightness, R: red signal brightness, G: green signal brightness, B: blue signal brightness).

6. The image combination device as defined in claim 3, wherein the edge extracting means includes at least one of a Prewitt filter and a Sobel filter.

7. The image combination device as defined in claim 3, wherein in the region extracting means, different identifiers are defined for pixels of the appropriate light exposure image on comparison with the edge intensities and the predetermined value.

8. The image combination device as defined in claim 1, wherein the statistic means comprises:

a pixel extracting means for reading out the pixel signals in the lower frequency region of the appropriate light exposure image, an adding means for calculating a histogram of the pixel signals of the appropriate light exposure image, and a smoothing means for averaging the adjacent signal levels of the histogram.

9. The image combination device as defined in claim 8, wherein the determining means comprises:

an extremal value detecting means for differentiating the histogram and thus, detecting maximum values and minimum values of the resultant differentiated data, a difference detecting means for detecting differences between the minimum values and the maximum values in the vicinity of their respective minimum values and a comparing means for determining a maximum difference value from the differences between the minimum values and the maximum values.

10. The image combination device as defined in claim 1, further comprising a compensating means for compensating data of the appropriate light exposure image.

11. The image combination device as defined in claim 10, further comprising an input-output controlling means for controlling introduction of the resultant compensated date of the appropriate light exposure image into the dividing means and the statistic means.

12. An image combination device which obtains a wide dynamic range image through combination of at least two images with different light exposure, comprising:

a photographing means for photographing an appropriate light exposure image and a different light exposure light image from the appropriate light exposure image, a dividing means for dividing a lower frequency region from the appropriate light exposure image on a frequency information of the appropriate light exposure image, a limiting means for determining a pixel signal level range which is composed of lower or higher pixel signals in brightness than a predetermined value within a range of the different light exposure image corresponding to the lower frequency region of the appropriate light exposure image, and a combining means for correcting the appropriate light exposure image and the different light exposure image in tone commensurate with a light exposure ratio thereof and combining the appropriate light exposure image and the different light exposure image on the pixel signal level.

13. The image combination device as defined in claim 12, wherein the dividing means and the limiting means constitutes a range calculating means.

14. The image combination device as defined in claim 12, wherein the dividing means comprises:

a pixel signal calculating means for calculating the pixel signals of the appropriate light exposure image, an edge extracting means for calculating edge intensities on the pixel signals of the appropriate light exposure image, and a region extracting means for extracting edge non-existence regions on comparison with the edge intensities and a predetermined value.

15. The image combination device as defined in claim 14, wherein in the pixel signal calculating means, a brightness of each pixel of the appropriate light exposure image is calculated.

16. The image combination device as defined in claim 15, wherein the brightness of each pixel of the appropriate light exposure image is calculated on the equation of $Y=0.299 \times R+0.587 \times G+0.114 \times B$ (Y:brightness, R: red signal brightness, G: green signal brightness, B: blue signal brightness).

17. The image combination device as defined in claim 14, wherein the edge extracting means includes at least one of a Prewitt filter and a Sobel filter.

18. The image combination device as defined in claim 14, wherein in the region extracting means, different identifiers are defined for pixels of the appropriate light exposure image on comparison with the edge intensities and the predetermined value.

19. The image combination device as defined in claim 12, wherein the limiting means comprises:

a setting means to setting a pixel signal level to divide the lower frequency region of the appropriate light exposure image, an adding means for selecting pixels lower or higher in brightness than a predetermined value within a range of the different light exposure image corresponding to the divided region of the appropriate light exposure image and adding the number of the selected pixels, and a judging means for judging whether the added pixel number is within an acceptable range or not.

20. The image combination device as defined in claim 19, wherein in the limiting means, the pixel signal level is varied so that the added pixel number is set within the acceptable range.

21. The image combination device as defined in claim 12, further comprising a compensating means for compensating data of the appropriate light exposure image.

22. The image combination device as defined in claim 21, further comprising an input-output controlling means for controlling introduction of the resultant compensated date of the appropriate light exposure image into the dividing means and the statistic means.

23. An image combination device which obtains a wide dynamic range image through combination of at least two images with different light exposure, comprising:

a photographing means for photographing an appropriate light exposure image and a different light exposure light image from the appropriate light exposure image, a dividing means for dividing a lower frequency region from the appropriate light exposure image on a frequency information of the appropriate light exposure image, a limiting means for determining a pixel signal level range which is composed of lower or higher pixel signals in brightness than a predetermined value within a range of the different light exposure image corresponding to the lower frequency region of the appropriate light exposure image, a statistic means for calculating a statistics value relating to characteristic values of pixel signals in the lower frequency region, a determining means for determining a pixel signal level to divide pixel signals of the appropriate light exposure image into an appropriate region and a bright or dark region on the statistics value, and a combining means for correcting the appropriate light exposure image and the different light exposure image in tone commensurate with a light exposure ratio thereof and combining the appropriate light exposure image and the different light exposure image on the pixel signal level.

24. The image combination device as defined in claim 23, wherein the dividing means, the statistic means, the determining means and the limiting means constitute a threshold value calculating means.

25. The image combination device as defined in claim 23, wherein the dividing means comprises:

a pixel signal calculating means for calculating the pixel signals of the appropriate light exposure image, an edge extracting means for calculating edge intensities on the pixel signals of the appropriate light exposure image, and a region extracting means for extracting edge non-existence regions on comparison with the edge intensities and a predetermined value.

26. The image combination device as defined in claim 25, wherein in the pixel signal calculating means, a brightness of each pixel of the appropriate light exposure image is calculated.

27. The image combination device as defined in claim 26, wherein the brightness of each pixel of the appropriate light exposure image is calculated on the equation of $Y=0.299 \times R+0.587 \times G+0.114 \times B$ (Y:brightness, R: red signal brightness, G: green signal brightness, B: blue signal brightness).

28. The image combination device as defined in claim 25, wherein the edge extracting means includes at least one of a Prewitt filter and a Sobel filter.

29. The image combination device as defined in claim 25, wherein in the region extracting means, different identifiers are defined for pixels of the appropriate light exposure image on comparison with the edge intensities and the predetermined value.

30. The image combination device as defined in claim 23, wherein the statistic means comprises:

a pixel extracting means for reading out the pixel signals in the lower frequency region of the appropriate light exposure image, an adding means for calculating a histogram of the pixel signals of the appropriate light exposure image, and a smoothing means for averaging the adjacent signal levels of the histogram.

31. The image combination device as defined in claim 23, wherein the determining means comprises:

an extremal value detecting means for differentiating the histogram and thus, detecting maximum values and minimum values of the resultant differentiated data, a difference detecting means for detecting differences between the minimum values and the maximum values in the vicinity of their respective minimum values and a comparing means for determining a maximum difference value from the differences between the minimum values and the maximum values.

32. The image combination device as defined in claim 23, wherein the limiting means comprises:

a setting means to setting a pixel signal level to divide the lower frequency region of the appropriate light exposure image, an adding means for selecting pixels lower or higher in brightness than a predetermined value within a range of the different light exposure image corresponding to the divided region of the appropriate light exposure image and adding the number of the selected pixels, and a judging means for judging whether the added pixel number is within an acceptable range or not.

33. The image combination device as defined in claim 32, wherein in the limiting means, the pixel signal level is varied so that the added pixel number is set within the acceptable range.

34. The image combination device as defined in claim 23, further comprising a compensating means for compensating data of the appropriate light exposure image.

35. The image combination device as defined in claim 34, further comprising an input-output controlling means for controlling introduction of the resultant compensated date of the appropriate light exposure image into the dividing means and the statistic means.

* * * * *